United States Patent
Nakajima et al.

(10) Patent No.: US 7,526,441 B2
(45) Date of Patent: Apr. 28, 2009

(54) PARTS LIST SYSTEM USED FOR PART NUMBER MANAGEMENT AND METHOD FOR PREPARING THE SAME

(75) Inventors: Mamoru Nakajima, Saitama (JP); Masataka Yamamoto, Saitama (JP); Naoki Saitou, Saitama (JP); Katsunori Taguchi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 367 days.

(21) Appl. No.: 10/394,567

(22) Filed: Mar. 21, 2003

(65) Prior Publication Data

US 2003/0182311 A1      Sep. 25, 2003

(30) Foreign Application Priority Data

Mar. 25, 2002   (JP)   ............................. 2002-084504

(51) Int. Cl.
*A01K 5/02*   (2006.01)
*G06Q 10/00*   (2006.01)
*G06F 17/30*   (2006.01)
*G06F 7/00*   (2006.01)

(52) U.S. Cl. .................. 705/29; 705/28; 707/104.1; 707/102; 700/97

(58) Field of Classification Search ............ 707/1–10, 707/100–104.1, 200–205; 700/1, 83
See application file for complete search history.

(56) References Cited

U.S. PATENT DOCUMENTS

| | | | |
|---|---|---|---|
| 5,119,307 A | 6/1992 | Blaha et al. | |
| 5,202,836 A | 4/1993 | Iida et al. | |
| 5,539,652 A | 7/1996 | Tegethoff | |
| 5,742,288 A * | 4/1998 | Nishizaka et al. | 345/418 |
| 5,777,877 A * | 7/1998 | Beppu et al. | 700/97 |
| 5,822,210 A | 10/1998 | Kobayashi et al. | |
| 5,838,965 A | 11/1998 | Kavanaugh et al. | |

(Continued)

FOREIGN PATENT DOCUMENTS

EP     0 467 257 A2     1/1992

(Continued)

OTHER PUBLICATIONS

Shaw C. Feng, Manufacturing Planning and Execution Software Interfaces, 2000, Journal of Manufacturing Systems, vol. 19/No. 1.*

(Continued)

*Primary Examiner*—F. Zeender
*Assistant Examiner*—Faris Almatrahi
(74) *Attorney, Agent, or Firm*—Carrier, Blackman & Associates, P.C.; Joseph P. Carrier; William D. Blackman

(57) ABSTRACT

A parts list system used for part number management is composed of a parts table database and a parts list controller. The parts table database includes a parts list which stores a state data and a part number data. The state data indicates a progress state of a part. And the part number data includes a number of the part as an identifier. The parts list controller inhibits change of the part number data, when the state data indicates prohibition of the change of the part number data.

12 Claims, 8 Drawing Sheets

U.S. PATENT DOCUMENTS

| | | | |
|---|---|---|---|
| 5,864,875 | A | 1/1999 | Van Huben et al. |
| 6,185,476 | B1 | 2/2001 | Sakai |
| 6,223,094 | B1 | 4/2001 | Muehleck et al. |
| 6,256,549 | B1 | 7/2001 | Romero et al. |
| 6,336,053 | B1* | 1/2002 | Beatty ................... 700/108 |
| 6,438,535 | B1 | 8/2002 | Benjamin et al. |
| 6,493,679 | B1 | 12/2002 | Rappaport et al. |
| 6,557,002 | B1 | 4/2003 | Fujieda et al. |
| 6,625,454 | B1 | 9/2003 | Rappaport et al. |
| 6,662,179 | B2 | 12/2003 | Benjamin et al. |
| 7,096,173 | B1 | 8/2006 | Rappaport et al. |
| 2001/0007997 | A1 | 7/2001 | Fujieda |
| 2001/0016803 | A1* | 8/2001 | Sartiono et al. ................ 703/1 |
| 2001/0023376 | A1 | 9/2001 | Uchida et al. |
| 2001/0042030 | A1* | 11/2001 | Ito et al. .................. 705/27 |
| 2002/0006799 | A1 | 1/2002 | Rappaport et al. |
| 2002/0032611 | A1 | 3/2002 | Khan |
| 2003/0004988 | A1 | 1/2003 | Hirasawa et al. |
| 2003/0055812 | A1 | 3/2003 | Williams et al. |
| 2003/0084019 | A1* | 5/2003 | Woodmansee ................ 707/1 |
| 2003/0187870 | A1 | 10/2003 | Nakajima et al. |
| 2003/0212766 | A1 | 11/2003 | Giles et al. |
| 2004/0098292 | A1 | 5/2004 | Miller et al. |

FOREIGN PATENT DOCUMENTS

| | | |
|---|---|---|
| EP | 0895170 | 2/1999 |
| GB | 2234097 | 1/1991 |
| GB | 2364801 | 2/2002 |
| JP | 62-062377 U | 3/1987 |
| JP | 02-171860 | 7/1990 |
| JP | 06-004604 | 1/1994 |
| JP | 06-162036 | 6/1994 |
| JP | 08-272838 | 10/1996 |
| JP | 09-128429 | 5/1997 |
| JP | 09-204449 | 8/1997 |
| JP | 09-245063 | 9/1997 |
| JP | 10-124550 | 5/1998 |
| JP | 10-240787 | 9/1998 |
| JP | 10-301972 | 11/1998 |
| JP | 10-320436 | 12/1998 |
| JP | 2000-202746 | 7/2000 |
| JP | 2001-022811 | 1/2001 |
| JP | 2001-195442 | 7/2001 |
| JP | 2001-202392 | 7/2001 |
| JP | 2001-297116 | 10/2001 |
| JP | 2001-306630 | 11/2001 |
| JP | 2001-325310 | 11/2001 |
| JP | 2002-024301 | 1/2002 |
| JP | 2002-073708 | 3/2002 |
| WO | WO 03/038688 A1 | 10/2002 |

OTHER PUBLICATIONS

Tony Valente, Product data mangement: It's more than just the latest fad, Printed Circuit Design, v18n1, p. 22-26, Jan. 2001.*

Integration of the STEP-based assembly model and XML schema with the fuzzy analytical hierarchy process (FAHP) for muti-agent bases assembly evaluation, Journal of Intelligent Manufacturing V17n5, p. 527, Oct. 2006.*

Jeanine Katzel, A plant engineer's guide to microcomputer applications software, Plant Engineering, vol. 39, p. 48(24), Jun. 27, 1985.*

* cited by examiner

Fig. 2

| NO. | LVL | STATE | PART CONFIGURATION | ITEM/PART NAME | QTY | MATERIAL | THICKNESS | WEIGHT |
|---|---|---|---|---|---|---|---|---|
| | | | ⊞F01 20000 | T/F TEST | | | | |
| 1 | F | | ⊞F01 20001 | TEST | | | | 0.0 |
| 2 | D | | ⊞20001-TGHA-A000 | TEST | 2 | | | 0.0 |
| | | | ⌙20001-TGHA-B000 | TEST | | | | |
| 1 | C | | ⊞F01 20002 | TEST | | | | 0.0 |
| 2 | D | | ⊞20002-TGHA-A000 | TEST | | M | | 0.0 |
| 1 | C | | ⌙20002-TGHA-ZZ00 | TEST | | | | 0.0 |
| 1 | C | | ⊞F01 20003 | TEST | | | | 0.0 |
| 2 | D | | ⊞20003-TGHA-B000 | SPEC | | M | | 0.0 |
| 1 | F | | ⊞F01 20004 | TEST | | | | |
| 2 | D | | ⊞20004-TGHA-A000 | SPEC L1 | | | | 0.0 |
| 1 | G | | ⌙2004Z-TGHA-ZZ00 | SPEC | | | | 0.0 |
| 1 | B | | ⊞F01 20005 | TEST | | | | |
| 2 | B | | ⊞20005-TGHA-0000 | SPEC C | | | | 0.0 |
| | | | ⌙2005Z-TGHA-ZZ00 | SPEC | | | | 0.0 |
| | | | ⊞F01 20006 | | | | | |

Fig. 5

| STATUS A | STATUS B | STATUS C | STATUS D | FIGURE FLAG | TOTAL FLAG | STATE |
|---|---|---|---|---|---|---|
| 51 | 52 | 53 | 54 | 55 | 56 | 57 |
| | | | | | | |

| PART NUMBER | TITLE COLUMN | CONFIGURATION PART COLUMN | CAD DATA |
|---|---|---|---|
| 46 | 47 | 48 | 49 |
|  |  |  |  |

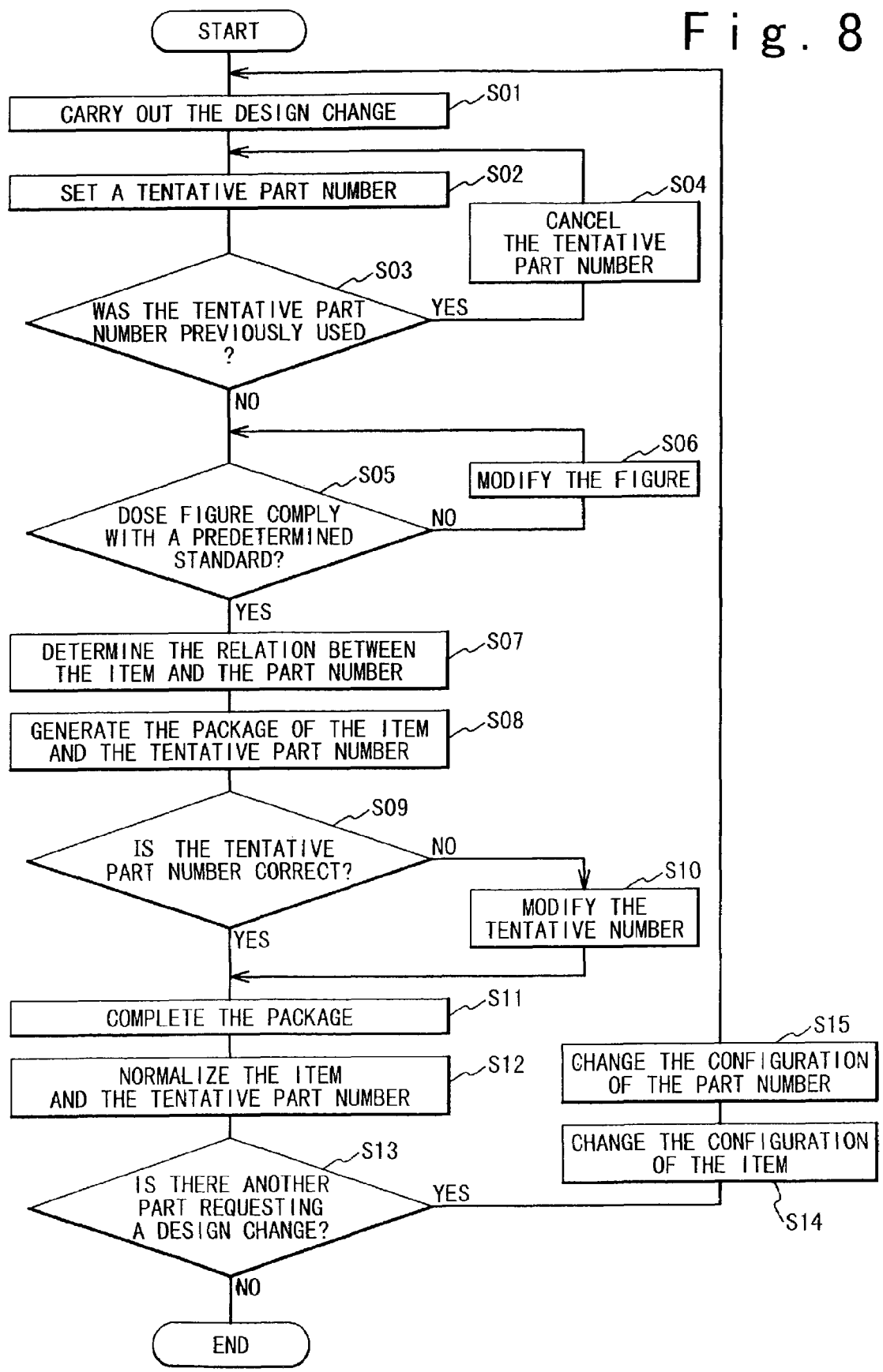

PARTS LIST SYSTEM USED FOR PART NUMBER MANAGEMENT AND METHOD FOR PREPARING THE SAME

BACKGROUND OF THE INVENTION

1. Field of the Invention

The present invention relates to a parts list (parts table) system on a computing system for managing a part configuration and the like of parts used in a product, and a method of preparing a parts list. More particularly, the present invention relates to a parts list system for preparing and managing a parts list and controlling a linkage to another data and the like, and a method of preparing a parts list.

2. Description of the Related Art

In designing an apparatus such as an automobile constituted of a large number of parts complicatedly, the parts are managed by using a parts table system. Here, the parts table is used for managing the configuration of parts, the number of parts, data peculiar of parts such as a record of design change of the parts, a assembling unit in the product, a usage state and the like, for each part. The parts include master parts (parts constituting the automobile) and slave parts (parts constituting the master parts).

In a conventional parts table system, design changes of parts and the record have to be managed strictly at a designing stage. And, even if the tentatively assigned part number (referred to as [tentative part number]) or a part configuration data are set at a planning/scheduling stage, they can not be directly used at the designing stage. Thus, the data such as the tentative part number and the part configuration data at the planning/scheduling stage can not be directly and continuously shifted to new parts table at the designing stage.

Designers can generate and maintain the data of the parts table of the planning/scheduling stage. But they have to prepare new part number and new part configuration data in new parts table at design stage so that the data at a planning/scheduling stage is reflected in the new parts table at the designing stage.

Also, the parts table at the planning/scheduling stage is disclosed only to limited personnel who are recognized as a participants by the designer. Other designers and persons who are not recognized can not check the parts table at the planning/scheduling stage. They can start to see the parts table from the designing stage. Thus, they start to confirm the parts table and to prepare opinions and requests from the design stage. Hence, it takes a long time to get the opinion and the request about the part table.

A system, which can unitarily manage the part numbers from the planning/scheduling stage to the designing stage, is desired. A system, which can shift the tentative part numbers in the parts table at the planning/scheduling stage continuously in their original states to the parts table at the designing stage and then use them, is desired. A system, which enables even other departments related to the development to share the parts table at the planning/scheduling stage, is desired.

Therefore, an object of the present invention is to provide a parts list system that can continuously manage part numbers from a planning/scheduling stage to a designing stage, and a method of preparing the parts list.

Another object of the present invention is to provide a parts list system that can shift tentative part numbers in a parts table at a planning/scheduling stage continuously to normal part numbers in a parts table at a designing stage, and a method of preparing the parts list.

Still another object of the present invention is to provide a parts list system that enables even other departments related to a development to share a parts table at a planning/scheduling stage and enables opinions to be widely obtained from persons related to the development at suitable timings.

SUMMARY OF THE INVENTION

Therefore, an object of the present invention is to provide a system and method for managing part numbers continuously from a planning/scheduling stage to a designing stage.

In an aspect of the present invention, a parts list system used for part number management is composed of a parts table database and a parts list controller. The parts table database includes a parts list which stores a state data and a part number data. The state data indicates a progress state of a part. And the part number data includes a number of the part as an identifier. The parts list controller inhibits change of the part number data, when the state data indicates prohibition of the change of the part number data.

It is advantageous if the parts list further stores a part data indicating data associated with the part.

It is advantageous if the parts list controller allows the change of the part number data, when the state data indicates permission of the change of the part number data.

It is advantageous if the parts list controller sets the state data based on a combination of a plurality of status data of the part and flags of the part. And the status data and the flags are set based on the progress state. And the state data are changed based on change of the combination.

Preferably, the parts list system is further composed of a display. The display displays the parts list in a form of a table to indicate the part number data of one part and the state data of the one part for each row of the table.

It is advantageous if the parts list further stores a configuration data including a relationship between a master part, which includes a plurality of slave parts, and the slave parts. And the state data of the master part is associated with any of the state data of the slave parts.

Preferably, the parts list system is further composed of a figure database. The figure database stores a figure data in which the part number data of the part and a figure of the part are correlated to each other. And the parts list controller inhibits the change of the part number data contained in the figure data, when the state data indicates the prohibition of the change of the part number data.

It is advantageous, when the part number data is changed to the tentative part number data, if the parts list controller checks validation of the tentative part number data by comparing the tentative part number data with a previously used part number data.

It is advantageous, when the part number data is changed to the tentative part number data, if the parts list controller checks validation of the tentative part number data by checking whether the tentative part number complies with a predetermined rule of the part number data.

It is advantageous, when the parts include a master part, which includes a plurality of slave parts, if the rule includes whether the tentative part number data of the slave part includes a piece of the part number data of the master part.

In another aspect of the present invention, a method for preparing a part list used for part number management is composed of:

preparing a part list storing a state data and a part number data, the state data indicates a progress state of a part, and the part number data includes a number of the part as an identifier;

setting the state data which indicates permission of change of the part number data;

assigning a tentative part number data serving as the part number data, when the state data indicates the permission of the change of the part number data;

setting the state data which indicates inhibition of the change of the part number data after changing design of the part; and defining the tentative part number data as a normal part number.

Preferably, the method is further composed of:

after assigning the tentative part number data, checking validation of the tentative part number data by comparing the tentative part number data with a previously used part number data.

Preferably, the method is further composed of:

before defining the tentative part number data as the normal part number data, checking validation of the tentative part number data by checking whether the tentative part number complies with a predetermined setting rule of a part number data. It is advantageous if the rule includes whether the tentative part number data of a slave part includes a piece of the part number data of a master part, when the part includes a master part, which includes a plurality of slave parts, and the slave parts.

In still another aspect of the present invention, a computer-readable program preparing a part list used for part number management includes the following steps:

preparing a part list storing a state data and a part number data, the state data indicates a progress state of a part, and the part number data includes a number of the part as an identifier;

setting the state data which indicates permission of change of the part number data;

assigning a tentative part number data serving as the part number data, when the state data indicates the permission of the change of the part number data;

setting the state data which indicates inhibition of the change of the part number data after changing design of the part; and defining the tentative part number data as a normal part number.

Preferably, the method is further composed of:

after assigning the tentative part number data, checking validation of the tentative part number data by comparing the tentative part number data with a previously used part number data.

BRIEF DESCRIPTION OF THE DRAWINGS

FIG. 2 is a view showing an example of a display screen of a parts list;

FIG. 5 is a view describing a state database;

FIG. 7 is a view describing a figure database; and

FIG. 8 is a flowchart showing an operation in an embodiment of a parts list system of the present invention.

DESCRIPTION OF THE PREFERRED EMBODIMENTS

Embodiments of a parts list system of the present invention and a method of preparing a parts list will be described below with reference to the attached drawings.

One embodiment is described by exemplifying a parts list used for a design of an automobile. However, this parts list can be applied to a design of another apparatus provided with a number of complex parts.

Figure 1:
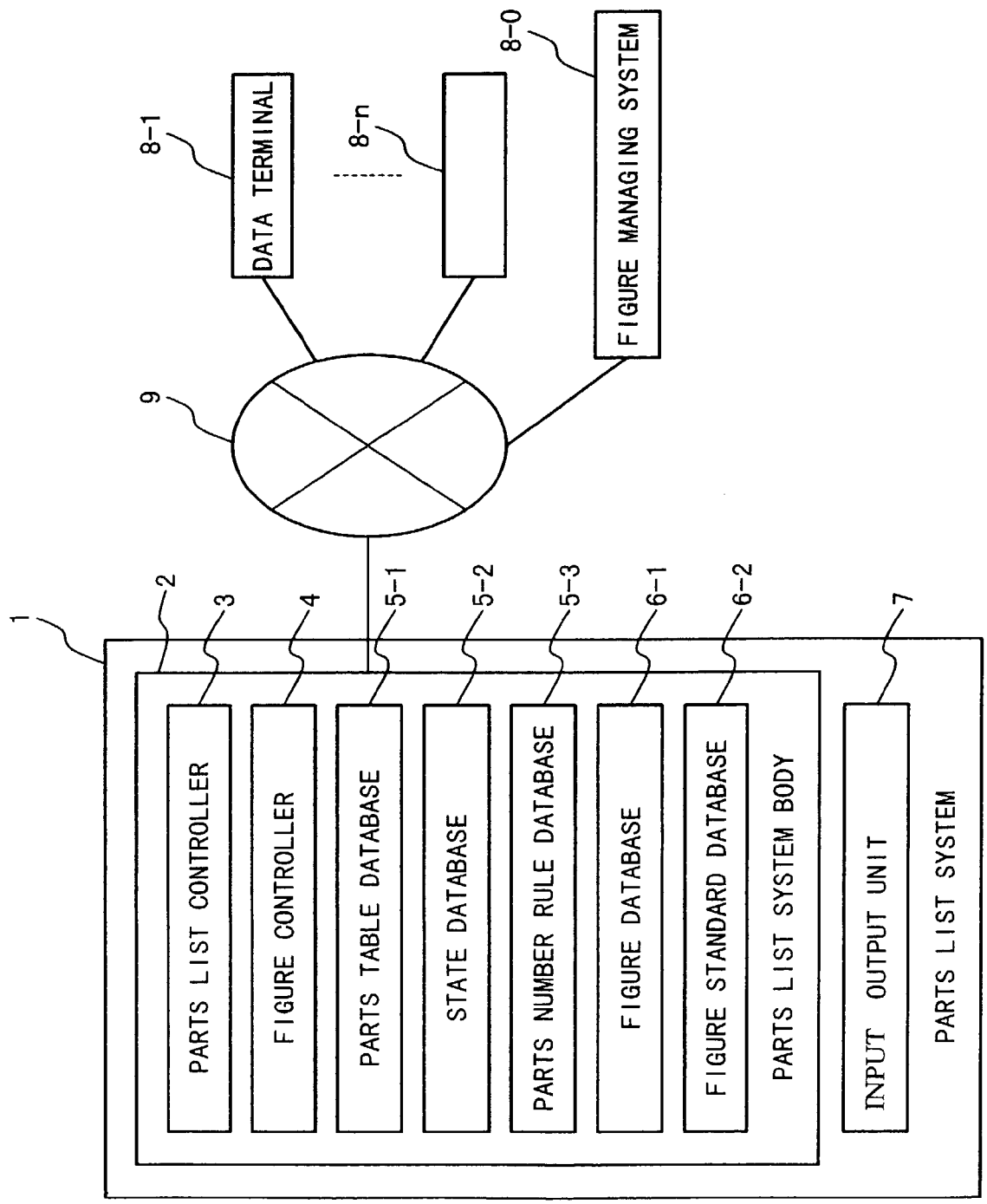
FIG. 1 is a view showing a configuration in an embodiment of a design system to which a parts list system of the present invention is applied.

FIG. 1 is a view showing a configuration in an embodiment of a design system to which the parts list system of the present invention is applied.

This design system is provided with a parts list system 1, a figure managing system 8-0 and a plurality of data terminals 8-1 to 8-*n*. They are connected by a two-way network 9.

In the present invention, with regard to items and parts, data indicating of their states are added to a parts list of a database, and tasks describing their states or combinations of the tasks are defined. Then a theory for judging the particular state at a time of a particular state is assembled in the design system.

In a case of a judgment at a planning/scheduling stage, the design system automatically checks whether or not a part number inputted to a parts table by a designer is already presented. If the part number is not presented, it is used as a tentative part number. Then, if an administration department receives the parts table containing this tentative part number after the planning/scheduling stage, the duplication of the part number is automatically checked again. If there is no duplication, the tentative part number is automatically updated to a normal part number, on the parts table.

Consequently, the tentative part number can be continuously used as the normal part number.

The parts list system 1 will be described hereinafter.

The parts list system 1 is a data processor exemplified as a workstation or a personal computer. It includes a parts list system body 2 and an input output unit 7.

The parts list system body 2 has a parts list controller 3 and a figure controller 4 serving as a program, and includes a parts table database 5-1, a state database 5-2, a parts number rule database 5-3, a figure database 6-1 and a figure standard database 6-2.

Based on the state data of a particular part among a plurality of parts in the parts list (parts table), the parts list controller 3 controls the change (removal of content, addition, change and the like) of various data of the particular part. The parts list is stored in the parts table database 5-1. The state data indicates a progress state of a plan, a design or so on of the part. The progress state of the plan or the design is state data such as the progress level in a series of processes. The progress level is represented by a schedule/plan, a design (change), a check of a figure, an inspection of a part number (check), a normalization of the part number and the like.

Here, a parts list (5-1') is an electronic parts table that is prepared and used by a method of this invention. The parts list (5-1') includes an item data, a part number data, an configuration data, a state data, a part application data, a part configuration data, and a position shape data linked to a part number.

The item data includes an item number (an item) and the name of an item. An item is constituted by a set of parts and items constitute a certain function.

The part number data includes a part number and a name of a part, which are identifiers that identify a part. The part number is a number individually assigned to each of parts constituting the item.

The state data includes a progress state of a plan or a design with regard to each of parts.

The part application data, the part configuration data and the position shape data are related to the part number.

Then, parts represented by part numbers are classified into a hierarchy for each item and arranged in a tree structure. For example, a part (a part number) of a first hierarchy is correlated to a tree of the first hierarchy, and a part (a part number) of a second hierarchy constituting the part of the first hierarchy is correlated to a tree of the second hierarchy. The second hierarchy is a lower order of the first hierarchy. Hereafter, they are similarly correlated. In this case, the part of the first hierarchy is a master part, and the part of the second hierarchy is a slave part.

The part application data is the data to indicate a combination of mechanisms (options) in which a part is used.

The part configuration data is the data peculiar to a part, such as the number of slave parts, material quality, weight, volume, cost, part analyzing method, a desirable part maker and the like.

The position shape data is the data to correlate a part number in the parts list with a part position data or the shape data stored in a different location to each other.

And, the position data or the shape data is the data (also referred to as a 3D (three-dimensional) data exemplified on a CAD figure) indicative of a part mount position and a part shape. Or the position data or the shape data is a figure and it is stored in the figure database 6-1.

The parts table database 5-1 stores the parts list 5-1'. The parts list 5-1' is opened to the persons in the related development. For example, they are an engineer, a person in charge of a research, a person in charge of a technical evaluation, a different designer, a person in charge of a purchase, a person in charge of a project, and the like. For receiving opinions about the parts list 5-1' from the related persons, they are allowed to write their opinions on a special region in the parts list 5-1', or to annex an attached file, or to establish a link with a file of the opinion data.

The state database 5-2 stores statuses A to D which will be described later, a figure flag and a total flag, and the state data while they are correlated to each other.

The part number rule database 5-3 stores a part number rule to define a rule with regard to an assignment of a part number.

The designer can view the opinion data indicated by the attached file described by the related person or the file of the link destination by opening the parts list 5-1'. That is, the opinion data of the concerned person can be easily checked on the parts list 5-1'. Thus, it is possible to decrease the time and the labor, and also possible to reduce the possibility of an oversight.

Here, the parts list 5-1' is further explained with reference to FIG. 2. FIG. 2 is a view showing an example of a display screen, which displays the electronic part list 5-1'. A display screen 10 includes: a part number display 11 having a number 13, a hierarchy 14, a state 15, a part configuration 16 and an item/part name 17; and a configuration data display 12.

The part number display 11 shows the data to specify a part. The number 13 (represented by No.) indicates a symbol based on a predetermined rule. The hierarchy 14 (represented by LVL) indicates the number of the above-mentioned hierarchy. The state 15 indicates the state data of the part. The part configuration 16 indicates a part number of each hierarchy represented in a form of a tree or an item. The item/part name 17 indicates the name of the item or the part.

The configuration data display 12 shows the part application data of the part, the part configuration data, the position shape data linked a part number and the other data with regard to the part, for each part.

The part configuration 16 has the tree structure as mentioned above. For example, below an item 16-1 (In FIG. 2, F01 2001), a part number 16-2 of a first hierarchy and a part number 16-3 of a second hierarchy (there is not a third hierarchy in FIG. 2) are represented in the tree structure. That hierarchy is represented in the hierarchy 14.

The data structure of the parts list 5-1' will be described below with reference to FIG. 3.

Figure 3:
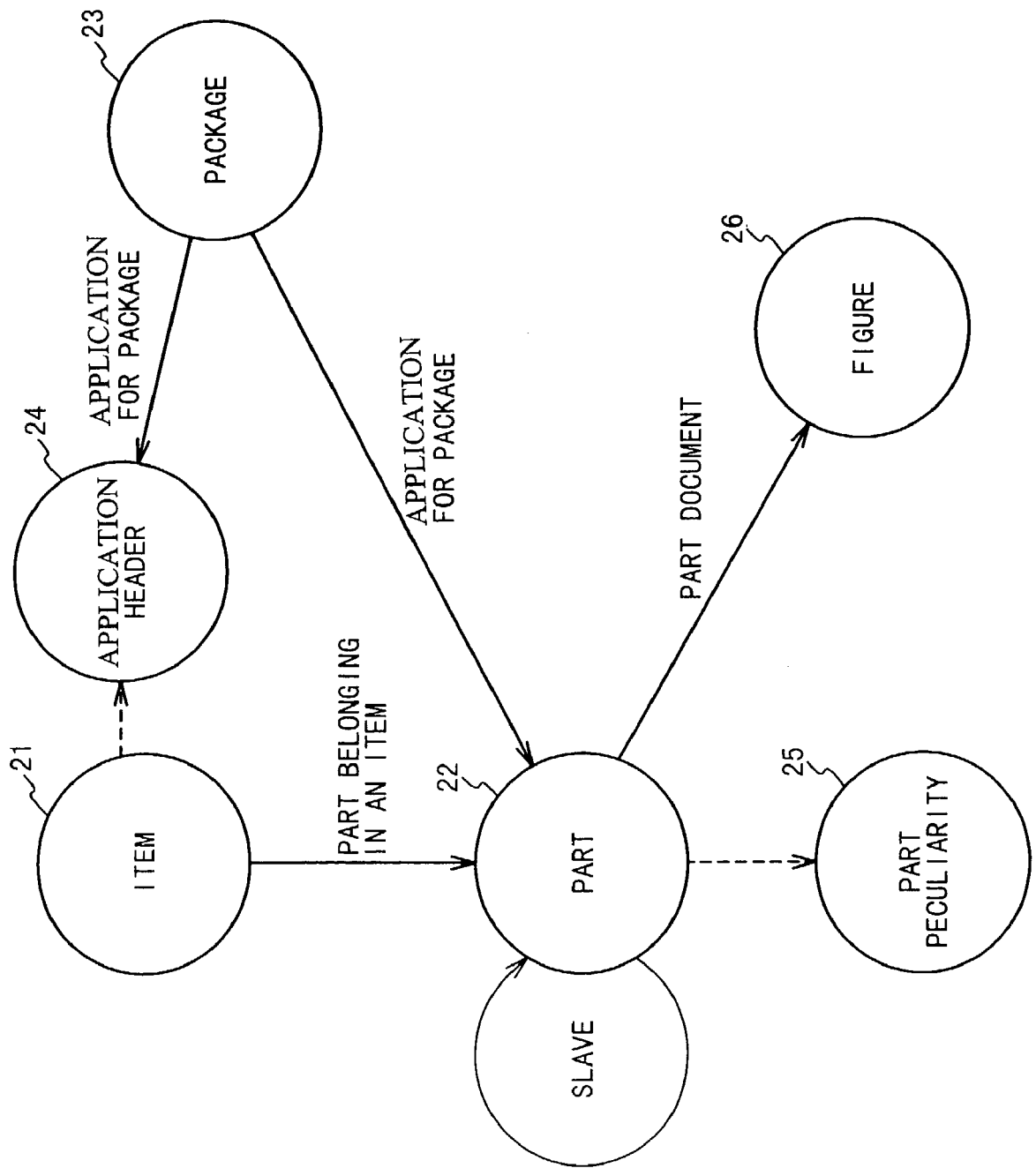
FIG. 3 is a view describing a data structure of a parts list.

FIG. 3 is a view describing the data structure of the parts list 5-1'. The parts list 5-1' is the set of the data having respective attributes of an item 21, a part 22, a package 23, an application header 24, a part peculiarity 25 and a FIG. 26.

The item 21 has an item data in which parts are included and a data indicative of a state of an item.

The part 22 has a part number data, a data indicative of a state of a part number, a figure check flag indicative of a presence or absence of a figure, and a state of an approval of a figure.

The package 23 has items, part numbers, a data indicative of a state of a package, and a total check flag indicative of a validation of the data of the item and the part number. The items and the part numbers constitute a group (hereafter, referred to as [Package]) of a set of figures to be collectively inspected.

The application header 24 has a data indicating a derivative data (a grade within a model) to which a part indicated by a part number is applied.

The part peculiarity 25 has a data (a part configuration data and the like) peculiar to a part, and the data correlated to the part number.

The FIG. 26 has a data which indicates a figure of a part indicated by the part number, and which is correlated to a part number.

The parts table database 5-1 will be further described. The parts table database 5-1 stores the parts list 5-1' in which a part number is correlated with various data of the part indicated by the part number.

Figure 4:
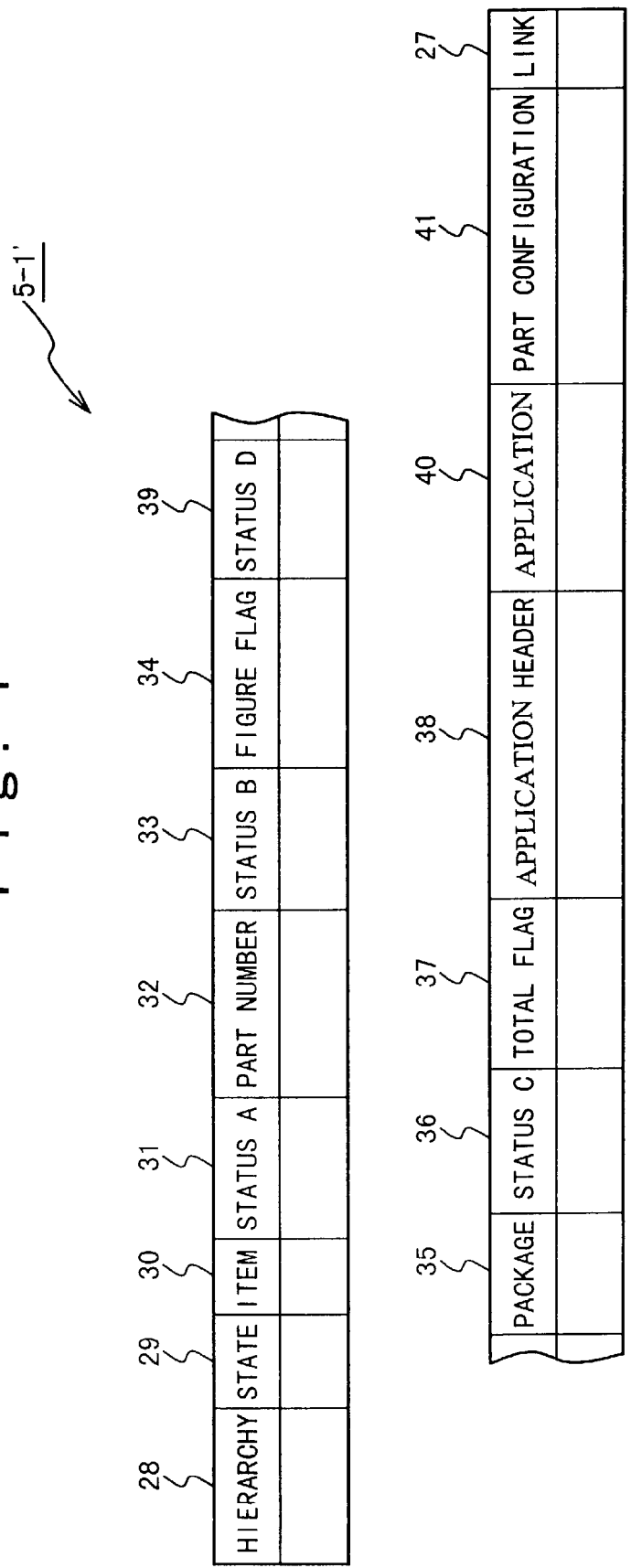
FIG. 4 is a view describing a parts table database.

FIG. 4 is a view illustrating the parts list 5-1' of the parts table database 5-1. The parts list 5-1' has a hierarchy 28, a state 29, an item 30, a part number 32, a status A 31, a status B 33, a figure flag 34, a status D 39, a package 35, a status C 36, a total flag 37, an application head 38, an application 40, a part configuration 41 and a link 27.

The hierarchy 28 corresponds to the hierarchy 14.

The state 29 corresponds to the state 15.

The item 30 is the item data and corresponds to the item number of the part configuration 16 and the item name of the item part name 17.

The status A 31 indicates the state with regard to an item and indicates states a1 to a4.

The part number 32 is the part number data and corresponds to the part number of the part configuration 16 and the part number name of the item/part name 17.

The status B 33 indicates the state with regard to a part number and indicates states b1 to b3.

The figure flag 34 is the figure check flag indicative of a presence or absence of a figure.

The status D 39 indicates the state with regard to the normalization of a figure and indicates a state d1.

The package 35 is a group (hereafter, referred to as [Package]) constituted by a part number and an item. The set of figures of the part number and the item is collectively inspected.

The status C 36 indicates the state with regard to a package and indicates states c1, c2.

The total flag 37 is the total check flag indicative of the validation of the data of a part number and an item.

The application header 38 is a derivative data (a grade within a model) to which a part indicated by a part number is applied.

The application 40 is the part application data.

The part configuration 41 is the part configuration data.

The link 27 is the data indicating link destinations with regard to other files, data, figures and the like.

The state database 5-2 is further described. The state database 5-2 stores statuses A to D as state display data, a figure flag and a total flag, and a state data while they are correlated to each other. In the state database 5-2, the combination of statuses A to D, a figure flag and a total flag is correlated to a state data.

Figure 5:
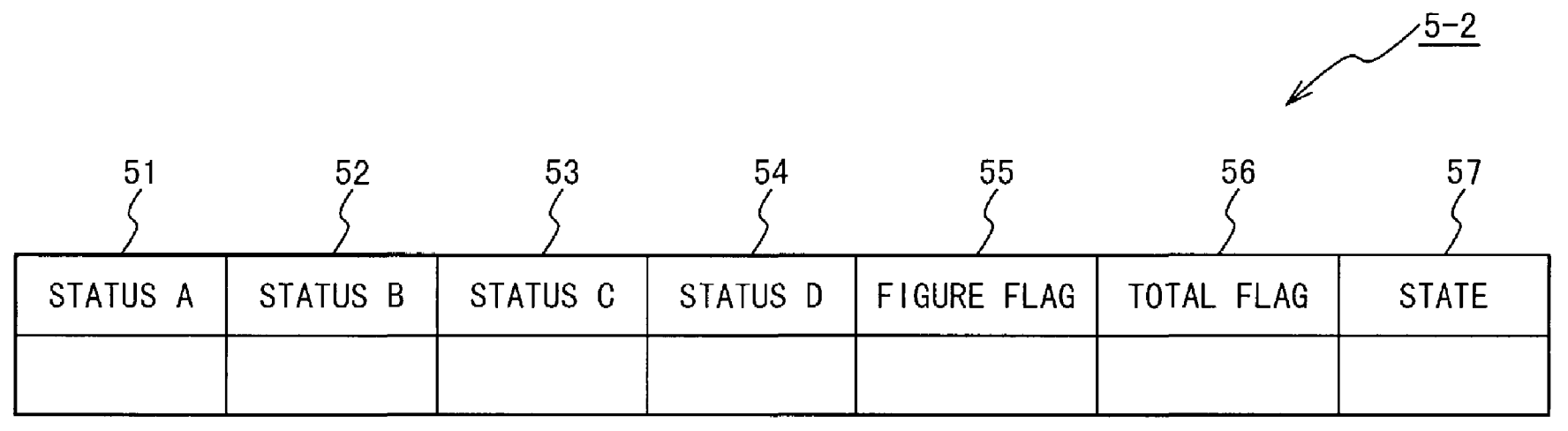

FIG. 5 is a view illustrating the state database 5-2. The state database 5-2 has a status A 51, a status B 52, a status C 53, a status D 54, a figure flag 55, a total flag 56 and a state 57.

The status A 51, the status B 52, the status C 53 and the status D 54 correspond to the status A 31, the status B 33, the status C 36 and the status D 39 of the parts list 5-1' (FIG. 4) in the parts table database 5-1, respectively. Similarly, the figure flag 55 and the total flag 56 correspond to the figure flag 34 and the total flag 37 of the parts list 5-1' (FIG. 4) in the parts table database 5-1, respectively.

The state 57 indicates the conditions (states) of permission, limit and inhibition with regard to the change of the data in the parts list 5-1' (FIG. 4). The state 57 (condition) is exemplified such that an operation of a part number and an application is free, an operation of a part number removal is not allowed, an operation of an application change is not allowed, or an operation of a part number change/addition/removal is not allowed.

Then, a certain state 57 is set for a certain combination of the status A 51, the status B 52, the status C 53, the status D 54, the figure flag 55 and the total flag 56. The parts list controller 3 determines the state 29 of FIG. 4, based on the status A 31, the status B 33, the status C 36, the status D 39, the figure flag 34 and the total flag 37 of FIG. 4, referring the state database 5-2. This value is reflected in the state 15 of FIG. 2.

The certain state 57 may be set for a certain combination of not only the status A 51, the status B 52, the status C 53, the status D 54, the figure flag 55 and the total flag 56, but also states or statuses of the part's slaves.

The state 15 (state data) in FIG. 2 is determined based on the combination of the four states of an item state, a part number state, a package state and an application state. Based on the combination, the state 15 is judged as each of the stages exemplified as a planning/scheduling stage (the operation of the part number and the application is free), a designing stage (the operation of the part number removal is not allowed), a figure output or release stage (the operation of the application change is not allowed) and a figure output or release stage b (the operation of the part number change/addition/removal is not allowed). In FIG. 2, symbols B, C, D, F and G are illustrated as the display examples of those states. For the purpose of this application "figure release stage" and "figure release state" are used interchangeably.

In the present invention, with regard to the item and the part, a data indicative of its state (the state 29) is added to the parts list 5-1'. When certain data is changed in the parts list 5-1', if the state 29 is changed in association with the change of the data, a function in this system automatically or unautomatically describes the change of the state base-d on the combination. The combination is determined based on the four states of the item state, the part number state, the package state and the application state. Thus, even if the same parts list 5-1' is referred to, the allowable (executable) operation at each stage is controlled based on the state 29 of the data with regard to the part number.

Also, it is possible to operate the data peculiar to the part in the parts list 5-1' without influence of the state 29, if the data peculiar provides a certain attribute of the part peculiarity.

By the way, the display of the parts list as shown in FIG. 2 is one embodiment, and it is not limited to this display.

Also, combinations of the states are not limited to the above-mentioned four cases. Also, it is possible to use not only the data of the states but also other data such as a flag and the like.

The person referring to the parts list finds out a proper part number from the part configuration 16 on the display screen of FIG. 2 and then views its line. So the person can view the data of the part indicated by the part number (including not only the data within the file of the parts list 5-1' but also the data correlated (linked) to the file (or the item, the part number) of the parts list 5-1'.

Also, the parts are modified or changed between the planning/scheduling stage and the manufacturing stage of the automobile, in many cases. And, their data of the modification are written to the file correlated to the parts list 5-1' or to the parts list 5-1' itself. Each modification or change of the part is reflected in the file at a real time. Thus, the concerned person can anytime know the latest situation of the development.

The parts list 5-1' may be prepared for each classification or may be collectively prepared for each model. Here, the classification implies a mechanism (for example, a frame, an engine, a transmission and the like), a model (for example, a car model), a section (for example, a roof) and an item (for example, a sunroof).

In this embodiment, [Correlation] or [Link] of a data includes a correlation between files, a correlation between a data within a file and a different file, a correlation between a data within a file and a data within a different file, and like. Then, the data/file can be called out from another data/file. For example, a storing location of the one file/data (for example, a database name, a path to a database and an address of a data within a database) is stored in another file/data. And then the file/data is called out by using another file/data. Or a name of a database in which the file/data is stored and the file name/part number are stored in another database. And then the file/data is called out by using them, and the like. However, it is not limited to these examples.

It is possible to use an approach of a conventional relational database to thereby carry out the correlation based on various keys.

As for the correlated data, the attribute of the FIG. 26 is assigned to the data with regard to a figure. The attribute of the part peculiarity 25 is assigned to the data except the data with regard to a figure unless otherwise specified.

The figure controller 4 checks whether or not a figure complies with the predetermined rule in the figure standard database 6-2. Then, if the figure does not comply with the rule, the figure controller 4 modifies the figure based on an input of a designer. The figure is stored in the figure database 6-1.

The figure database 6-1 stores a part number data and a figure of the part specified by the part number data while they are correlated to each other.

The figure standard database 6-2 stores a predetermined figure standard data.

Figure 6:
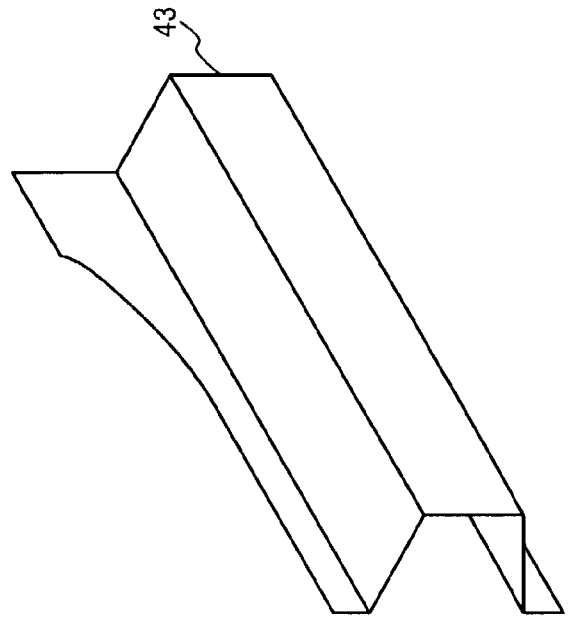
FIG. 6 is a view showing an example of a display screen of a figure.

Here, the figure is further explained with reference to FIG. 6. FIG. 6 is a view showing an example of a display screen of the figure. A display screen 45 has a configuration part column 42, a CAD FIG. 43 and a title column 44.

The configuration part column 42 displays a data to specify a slave part, such as a part number, a part name and the like. The slave part constitutes a master part drawn on the figure. The CAD FIG. 43 is a three-dimensional CAD data of a part. The title column 44 displays a data to specify a part drawn on the figure.

By the way, the display of the figure as shown in FIG. 6 is one embodiment. It is not limited to this display.

A data with regard to a figure stored in the figure database 6-1 will be further described. The figure database 6-1 stores a figure data 6-1' (figure data) in which a part number data and a figure of a part specified by the part number data are correlated to each other.

FIG. 7 is a view describing the figure data 6-1' of the figure database 6-1. The figure data 6-1' has a part number 46, a title column 47, a configuration part column 48 and a CAD data 49.

The part number 46 is the part number data and corresponds to a part number contained in the title column 47 or the configuration part column 48. The title column 47 is the data of the title column 44 of the figure. The configuration part column 48 is the data of the configuration part column 42 of the figure. The CAD data 49 is the data of the CAD FIG. 43 of the figure.

Item numbers, part numbers, items and part names of the data in the title column 47 and the configuration part column 48 are correlated to the item 30 (the item data) and the part number 32 (the part number data) in the parts table database 5-1.

Then, if the data with regard to the part in the data of the configuration part column 42 or the title column 44 is changed, the figure controller 4 controls the change of the parts table database 5-1 with the parts list controller 3. So the content of the change is reflected in the item 30, the part number 32, the part configuration 41 and the like of the parts table database 5-1. At this time, the parts list controller 3 does not allow the control if the notation and the change of the item, the part number and the other data with regard the part in the parts list 5-1' are not allowed. If the parts list controller 3 does not allow the control, the figure controller 4 cancels the notation and the change of the data corresponding to the figure data 6-1'.

The CAD FIG. 43 may be obtained from the design data of another model designed already or may be independently generated by the designer.

The input output unit 7 is conventionally known as the input output unit used in a workstation or a personal computer. A keyboard and a mouse are exemplified as the input unit.

A display and a printer are exemplified as the output unit.

The figure managing system 8-0 is exemplified as the workstation or the personal computer. It is the information processor that can access the parts list system 1 through the network 9. It carries out an admission and management of a figure.

The information terminals 8-1 to 8-n (n=1, 2, ...) are exemplified as the work station or the personal computer, and they are the information processing terminals that can access the parts list system 1 through the network 9. The persons concerned in the development use them to access the parts list system 1. Also, they can directly use the parts list system 1.

The network 9 is the dedicated line exemplified as LAN (Local Area Network) or the communicable line, such as a public line and the like, exemplified as the Internet.

An embodiment of a preparing method (an operation in the electronic part lists system 1) of the parts list 5-1' in the present invention will be described below with reference to the attached drawings.

FIG. 8 is a flowchart showing the embodiment of the preparing method (the operation in the parts list system 1) of the parts list 5-1' in the present invention.

(1) Step S01.

At the planning/scheduling state, a designer plans or schedules a design change of a part, based on a referential/independent consideration of various data and the like. Then, based on the schedule/plan, the figure controller 4 is used to select the part from the figure database 6-1 and read out its figure and then carry out the design change.

At this stage, the statuses A 31/B 33/C 36 are at a1/b1/c1. The combination of these statuses shows the state at which changing the data of the part is allowed, based on the state database 5-2. This state is indicated by using the proper signs (or symbols) for the state 29 (and the display of the state 15).

(2) Step S02

In the figure controller 4, the part is modified based on the design change of the designer, and the part numbers located at the proper position of the title column 44 and the configuration part column 42 in the screen display 45 are revised. These revisions are reflected in the data of the title column 47 and the configuration part column 48 on the figure database 6-1. The part number in this case is the tentatively-set part number (the part number or the tentative part number).

Even at this stage, the statuses A 31/B 33/C 36 are still at the a1/b1/c1. Similarly, the combination of these statuses shows the state at which changing the data of the part is allowed.

(3) Step S03

If the part number is changed, the figure controller 4 inquires of the parts list controller 3 whether or not the tentative part number overlaps with another part number. The parts list controller 3 retrieves the parts list of the parts table database 5-1, and examines whether or not the tentative part number was previously used. The examined result is sent back to the figure controller 4.

If the tentative part number was previously not used and there was no duplication, it is assumed that the figure controller 4 uses the tentative part number. Then, the content of the part number 32 of the parts table database 5-1 is changed based on the tentative part number.

Even at this stage, the statuses A 31/B 33/C 36 are still at the a1/b1/c1. Similarly, the combination of these statuses shows the state at which changing the data of the part is allowed.

If the tentative part number was previously used and there was the duplication, the operational flow proceeds to a step S04.

(4) Step S04

Since the tentative part number was previously used and there was the duplication, the figure controller 4 cancels use of the tentative part number. Then, the figure controller 4 carries out the display indicating the fact and instructing the designer to again set the tentative part number.

The designer modifies the tentative part number based on its content. The operational flow proceeds to the step S02.

(5) Step S05

The figure controller 4 inspects whether or not the figure complies with a predetermined standard.

The case of the compliance leads to the completion of the figure.

Based on the completion of the figure, the parts list controller 3 sets a figure check flag of the figure flag 34 of the part. The statuses A 31/B 33/C 36 are still at the a1/b1/c1. The combination of this flag and these statuses shows the state at which the removal of the part number 32 (and the display of the part number of the part configuration 16 (the tentative part number) from the state database 5-2 is not allowed. This state is indicated by using the proper sign (or symbol) for the state 29 (and the display of the state 15).

After that, in the case of the compliance, the operational flow proceeds to a step S07. In the case of the non-compliance, the operational flow proceeds to a step S06.

(6) Step S06

Since the figure does not comply with the predetermined standard, the figure controller 4 carries out the display indicating the fact and the display of the content of the refusal, for a designer. Designers can change the figure.

The designer modifies the figure based on this content. The operational flow returns back to the step S05.

(7) Step S07.

The parts list controller 3 determines the relation between the item 30 and the part number 32 of the part used therein, since the figure is completed. At the same time, the statuses A 31/B 33/C 36 are changed to a2/b1/c1. The combination of these statuses shows the state at which the change of the application 40 (the display of the part application data of the configuration data display 12) from the state database 5-2 is not allowed. This state is indicated by using the proper sign (or symbol) for the state 29 (and the display of the state 15).

(8) Step S08

The designer determines the item 30 and the part number 32 (the tentative part number) to generate a package of a set of figures to be collectively inspected at a unit of the design change.

Based on the input of the item 30 and the part number 32 (the tentative part number) to generate the package from the designer, the parts list controller 3 writes them to the package 35. At the same time, the statuses A 31/B 33/C 36 are changed to a2/b1/c2. The combination of these statuses shows the state at which the operation (the removal, the change or the addition) of the part number 32 (and the display of the part number of the part configuration 16 (the tentative part number)) from the state database 5-2 is not allowed. This state is indicated by using the proper sign (or symbol) for the state 29 (and the display of the state 15).

(9) Step S09

The parts list controller 3 checks whether or not the tentative part numbers are correct, with regard to the item 30 and the plurality of part numbers 32 (tentative part numbers) packaged at the unit of the design change (the total check). There are the check contents as to whether or not the part number 32 complies with a part number rule (stored in the part number rule database 5-3), whether or not there is a piece of master part number (a part number and an item in a high order hierarchy) in a part number of a low order hierarchy, whether or not the part number in the high order hierarchy is used in the low order hierarchy, whether or not the same item/part numbers are used, and the like. All of the items 30 and the part numbers 32 in the parts list are inspected.

If there is no problem, the figure is completed. Then, the part number 32 becomes the normal part number from the tentative part number.

At this time, the parts list controller 3 sets the total check flag of the total flag 37 of the part, at the same time. However, the statuses A 31/B 33/C 36 are still at the a2/b1/c2. This state, which is determined by the combination of this flag and these statuses, is indicated by using the proper sign (or symbol) for the state 29 (and the display of the state 15), based on the state database 5-2.

After that, if there is no problem, the operational flow proceeds to a step S11. If there is a problem, the operational flow proceeds to a step S10.

(10) Step S10

Since there is a problem in the tentative part number 32, the parts list controller 3 carries out the display indicating the fact and the display of the problematic content, for a designer.

The designer modifies the tentative part number of the figure and the electronic part list.

(11) Step S11

The end of the total check leads to the completion of the package composed of the set of the figures, at the unit of the design change.

The parts list controller 3 outputs (figure-outputs) the figure to a figure managing system 8-0 belonging to a managing department of a design change, and changes the statuses A 31/B 33/C 36 to a3/b2/c2. This state, which is determined by the combination of this flag and these statuses, is indicated by using the proper sign (or symbol) for the state 29 (and the display of the state 15), based on the state database 5-2.

The designer submits the output figure to the managing department of the design change.

(12) Step S12

Based on the signal indicative of the admission of the design change from the figure managing system 8-0, the parts list controller 3 normalizes the item 30 and the part number 32, based on the input of the designer. At this stage, the design change is normally registered in the corresponding portion of the parts list 5-1' in the parts table 5-1 database, which results in the situation that the change is not allowed.

At this time, the parts list controller 3 sets the status D 39 to d1. The statuses A 31/B 33/C 36 are still at the a3/b2/c2. This state, which is determined by the combination of these statuses, is indicated by using the proper sign (or symbol) for the state 29 (and the display of the state 15), based on the state database 5-2. This state enables the parts list controller 3 to operate (remove, change or add) the display of the part number in the part configuration 16 and change the display of the part application data in the configuration data display 12 for changing another part.

(13) Step S13

If there is another part requesting a design change, the operational flow proceeds to a step S14. If not so, it is ended.

(14) Step S14

The parts list controller 3 changes the configuration of the item, based on the input of the designer, and carries out the preparation for a new design change.

At this time, the parts list controller 3 changes the statuses A 31/B 33/C 36 to a4/b3/c2. This state, which is determined by the combination of these statuses, is indicated by using the proper sign (or symbol) for the state 29 (and the display of the state 15), based on the state database 5-2.

(15) Step S15

The parts list controller 3 changes the configuration of the part number, based on the input of the designer, and carries out the preparation for a new design change.

At this time, the statuses A 31/B 33/C 36 are still at the a4/b3/c2. This state, which is determined by the combination of these statuses, is indicated by using the proper sign (or symbol) for the state 29 (and the display of the state 15), based on the state database 5-2. The operational flow returns back to the step S01.

The designer executes this process, for all of the parts requested to have the design changes.

At each of the steps mentioned above process, from the combination of the statuses (state data) A 31/B 33/C 36/D 39, it is possible to discriminate between the states of the parts specified based on the items 30 and the part numbers 32 (the planning/scheduling stage, the figure checking stage, the totally checking stage, the figure output stage, the normalizing stage and the like), one by one.

Consequently, even if the tentative part number assigned to the part at the planning/scheduling stage is written to the parts list (the parts table) before the normalization, whether it is done before or after the normalization can be precisely grasped. That is, even if the part numbers at the various stages are noted on the same parts list, from the state data 15, it is possible to execute the strict management of the respective part numbers.

Then, the usage of the same parts list enables the part numbers of all the parts from the planning/scheduling stage to the final determination to be unitarily managed.

In the present invention, the parts list 5-1' is opened. Thus, the data and the data in relation to the development can be opened (disclosed) to the persons concerned in the development without any omission.

Then, at this time, the same part numbers are used from the planning/scheduling stage through the designing stage to the normalizing stage. Thus, even if the persons except the designer view the parts list 5-1' at any stage, they can grasp the content quickly and precisely. Hence, it is possible to widely obtain the opinions from the persons except the designer.

According to the present invention, the tentative part number in the parts table at the planning/scheduling stage can be continuously shifted in its original state to the part stable at the designing stage and then used. Moreover, the part number can be unitarily managed from the planning/scheduling stage to the designing stage.

Although the present invention has been described in terms of some embodiments, it is not intended that the invention be limited to these embodiments. Modification within the spirit of the invention will be apparent to those skilled in the art. For example a master part's state is not only determined by the combination of its statuses, but may be associated with a slave part's state.

What is claimed is:

1. A system for assigning and managing part numbers of a parts list in part planning and design of a product including multiple parts, the system comprising:
    a parts table database including
    a single parts list which stores state data regarding parts of a product during stages of a parts planning and development process and part number data,
    said state data indicates a progress state of each said part during a planning stage, a design stage, and a figure release stage thereof, and
    said part number data includes a part number of each said part as an identifier, each said part number including one of a normal part number data uniquely assigned to said part and a tentative part number data assigned to said part;
    a parts list controller which selectively permits and inhibits change of said part number data based on said state data, said parts list controller assigning a tentative part number data when said state data indicates permission of the change of the part number data of the part and inhibiting change of said part number data when said state data indicates prohibition of the change of said part number data;
    when a tentative part number data has been assigned to the part, said parts list controller checks whether the tentative part number data is valid, and if the tentative part number data is validated the controller changes the tentative part number data to a normal part number for the part; and
    said parts list system unitarily manages said part number data continuously during said planning, design and figure release stages.

2. A parts list system according to claim 1, wherein said parts list further stores a part data indicating data associated with said part.

3. A parts list system according to claim 1, wherein said parts list controller allows the change of said part number data, when said state data indicating the progress state of said part indicates permission of the change of said part number data.

4. A parts list system according to claim 1, wherein said parts list controller sets said state data for each said part based on a combination of a plurality of status data of said part and flags of said part, said status data and said flags are set and updated based on said progress state, and said state data are changed based on change of said combination.

5. A parts list system according to claim 1, further comprising:
    a display which displays said parts list in a form of a table to indicate said part number data of one part and said state data of said one part for each row of said table.

6. A parts list system according to claim 1, wherein said parts of the product include slave parts and a master part which includes a plurality of said slave parts, said parts list further stores a configuration data including a relationship between said master part and said slave parts of said master part, and
    said state data of said master part is associated with any of said state data of said slave parts of said master part.

7. A parts list system according to claim 1, further comprising:
    a figure database which stores a figure data in which said part number data of said part and a figure of said part are correlated to each other; and
    wherein said parts list controller inhibits the change of said part number data contained in said figure data, when said state data indicates the prohibition of the change of said part number data.

8. A parts list system according to claim 1, wherein said parts list controller checks whether said tentative part number data is valid by comparing said tentative part number data with part number data previously used in the system.

9. A parts list system according to claim 1, wherein said parts list controller checks validation of said tentative part number data by checking whether said tentative part number data complies with a predetermined rule of said part number data.

10. A parts list system according to claim 9, wherein parts listed in the parts list include a master part, which includes a plurality of slave parts, and said rule includes whether said tentative part number data of a slave part includes a piece of said part number data of said master part.

11. The parts list system according to claim 1, wherein said single parts list is commonly used within the parts list system regardless of a progress state of a part.

12. The parts list system according to claim 1, wherein said state data is changed by persons involved in the planning and design of the parts of the product.

* * * * *